Patented Jan. 13, 1925.

1,522,531

UNITED STATES PATENT OFFICE.

JOSEPHUS SNYDER MEYERS, OF WOODSTOCK, ONTARIO, CANADA.

METHOD OF TREATING OATS OR OTHER CEREALS.

No Drawing.   Application filed December 6, 1923.   Serial No. 679,022.

*To all whom it may concern:*

Be it known that I, JOSEPHUS SNYDER MEYERS, a subject of the King of Great Britain, and a resident of the city of Woodstock, in the county of Oxford, in the Province of Ontario, Canada, have invented certain new and useful Improvements in Methods of Treating Oats or Other Cereals, of which the following is the specification.

My invention relates to improvements in the method of treating oats or other cereals, so that when the cereal is reduced from the granular form into the ground or cut oatmeal or rolled oats form the original weight of the grain will be ensured in the final product and yet incidentally the flavor materially improved, the yield increased, and the marketability greatly enhanced.

It is well known that oats and cereals generally in their original condition when received into a mill or plant contain an average of thirteen per cent or thereabouts of moisture. In the method generally employed to produce rolled oats the oats are dried in the mill or plant by suitable means to eight per cent of moisture or thereabouts. The oats are then shelled into the groat condition and passed through a steamer or tempering device to soften the groat, for flaking, the percentage of moisture being increased to nine and one-half per cent or thereabouts.

After a good deal of experiment I have found that reducing the oats to approximately eight per cent moisture does not serve to produce the best yield and a nutty flavor, and it is with the object incidentally of producing this flavor and at the same time not reducing the weight of the original grain, but particularly of increasing the yield, that my invention is particularly designed.

It is well known that the weight by the known process is reduced when the final product is reached thereby resulting in a loss to the miller and this is the reason that I desire to devise a method whereby not only this loss of weight may be avoided but as I have hereinbefore stated the flavor of the product materially improved.

The method I follow is first to dry the grain by putting the oats through dry kilns or by other suitable means to six per cent moisture or thereabouts to harden the groat. In fact the groat becomes so very hard that when passing through the shellers it will not break as in the ordinary drying, thus reducing what is known as middlings to an infinitesimal quantity, which is my main object in drying to a minimum. Incidentally such hardening of the groat gives a better flavour and keeping the groats intact gives a better yield. It will be seen by this hardening of the groat the waste is reduced to a minimum and the yield increased.

In the old method the moisture content of freshly made rolled oats runs between nine and ten per cent which is about three per cent below the moisture content of oats when reaching the mill. The advantage of my process therefore, will be apparent as there is no shrinkage in moisture or weight. After the oats have been reduced in moisture and shelled I add moisture to the resulting product by means of a primary steamer or other suitable means through which the groat is passed to bring it up to nine and one-half per cent of moisture or thereabouts and then through what is known in the art as a tempering machine to introduce moisture into the groat and thereby raise the moisture again until it reaches about eleven to eleven and one-half per cent or thereabouts.

I again introduce this product to the final steamer whereby I attain the original percentage of moisture of the grain when it is received in the mill.

It will, of course, be understood that the bringing of the groats from the dried point to the final state of moisture need not be effected in three separate steps nor by the specific means hereinbefore referred to but it is necessary to temper it or increase the moisture from the dried percentage until it reaches the original percentage of moisture to insure no loss in weight.

In practice, however, I preferably use the steps, which I have hereinbefore stated.

The advantage I obtain by utilizing these three steps aforesaid is that, if the groats were treated with water only, which might be done, it would practically take five times as long as by using the steps I have innumerated for the reason that the primary steaming opens the pores and when the water is introduced in the tempering machine it is more quickly absorbed. The steaming again tends to quicken the process.

Although I have described my method particularly adaptable for rolled oats, oatmeal is made in the same manner so far as drying and shelling the oats is concerned but the original amount of moisture may be added to the groats before being ground or cut or to the oatmeal in the course of manufacture.

Notwithstanding the process hereinbefore set out the groat may only contain eight or more per cent or less of moisture yet the moisture may be added by my process so as to bring the moisture percentage up to the original amount of moisture contained originally in the grain, thereby increasing the yield.

The ordinary and usual way of making rolled oats, oatmeal etc., is simply by drying in kilns and leaving about eight per cent of moisture in the grain when the grain is shelled, and is then rolled, ground or cut, which does not give the flavor or the yield as in my process, wherein I first dry to a minimum and finally bring up to the original amount of moisture.

By following the above method or process I am enabled as hereinbefore referred to, to produce a superior quality of oatmeal or other cereal than what has heretofore been placed on the market, and at the same time materially increase the yield. In the resultant product the moisture having reached the original precentage when taken to the mill, loss by weight is absolutely avoided.

What I claim as my invention is:

1. The method or process of treating oats or other cereals consisting in drying the cereal to such a degree of hardness as will minimize, when shelled, the waste oat middlings produced, and then tempering the groats by moisture until the original percentage when taken into the mill is attained.

2. The method or process of treating oats or other cereals consisting in drying the cereal to such a degree of hardness as will minimize, when shelled, the waste oat middlings produced and then tempering the groats by moisture until the original percentage when taken into the mill is attained, by first steaming, then tempering by introducing water, and again steaming.

JOSEPHUS SNYDER MEYERS.

Witnesses:
 POLET BOYD,
 R. G. SELLECK.